Oct. 23, 1962 F. W. KELLEY, JR 3,060,369

HIGH-GAIN MAGNETIC AMPLIFIERS

Filed Oct. 26, 1956 3 Sheets-Sheet 1

Inventor:
Fred W. Kelley, Jr.
by Richard E. Hosley
His Attorney

Oct. 23, 1962 F. W. KELLEY, JR 3,060,369

HIGH-GAIN MAGNETIC AMPLIFIERS

Filed Oct. 26, 1956 3 Sheets-Sheet 2

Inventor:

Fred W. Kelley, Jr.

by Richard E. Hosley

His Attorney

Oct. 23, 1962 F. W. KELLEY, JR 3,060,369

HIGH-GAIN MAGNETIC AMPLIFIERS

Filed Oct. 26, 1956 3 Sheets-Sheet 3

Inventor :
Fred W. Kelley, Jr.
by Richard E. Hosley
His Attorney

United States Patent Office 3,060,369

Patented Oct. 23, 1962

3,060,369
HIGH-GAIN MAGNETIC AMPLIFIERS

Fred W. Kelley, Jr., Melrose, Mass., assignor to General Electric Company, a corporation of New York Filed Oct. 26, 1956, Ser. No. 618,559
9 Claims. (Cl. 323—89)

The present invention relates to improvements in saturable core apparatus and, more particularly, to magnetic amplifiers having improved gain and response characteristics.

Saturable reactance devices of the type including A.-C. output or gate windings and D.-C. saturating or control windings disposed about saturable magnetic core members have found widespread application in supplementing or replacing electronic amplifiers and rotating regulators, especially where they are brought into certain high-gain circuit relationships with rectifiers. Apparatus of this high-gain construction has commonly been identified by the term "amplistat." In the design of high-power versions of the common amplistat, it is found that the usual D.-C. control winding components and their associated circuitry must be of such considerable bulk and power capacity, due to gain limitations, that their use may be prohibited in many applications. If the gain deficiencies are sought to be overcome by cascading, then the overall system bulk and power consumption are merely aggregated, and the ranges of control are severely limited also. Even in equipments of lesser power output ratings the usual form of control winding offers undesirable constructional complications, such that manufacture tends to be complex and costly, the composite polyphase units being particularly troublesome in these respects. Those skilled in the art further recognize that it is in the D.-C. control winding circuitry that undesirable harmonic interference phenomena occur, and that a disadvantageous time constant or dynamic response characteristic is also associated with the control winding circuit. Gain, accuracy, speed of response, and stability are thus presently limited.

Accordingly, it is one of the objects of the present invention to provide magnetic amplifier apparatus wherein the control circuitry yields improved gain and response characteristics.

Further, it is an object to provide improved magnetic amplifier apparatus in which output control is achieved through the gate windings themselves, with the usual D.-C. control windings being eliminated.

An additional object is to provide magnetic amplifier apparatus of simplified construction and reduced bulk which is capable of supplying large controlled outputs of power.

By way of a summary account of this invention in one of its aspects, I provide saturable core material upon which is wound a pair of gate or load windings each having a tap intermediate its ends, these gate windings each being in a series relationship with an A.-C. source, a different rectifier, and a common load. Between the gate winding taps of this controlled device, there is coupled a relatively low power control saturable reactor which may be of a conventional physical construction having a pair of gate windings and at least one D.-C. control winding associated with saturable core material. The control saturable reactor gate windings are each serially coupled with the aforementioned taps through a differently polarized rectifier, whereby high gain is achieved. By appropriate design, the gate winding exciting current component, which is the current flowing in the gate windings before "firing" or saturation occurs, is caused to be a lesser value in the gate windings of the control saturable reactor device than is required in the tapped portions of the gate windings in the controlled device. Further the A.-C. source and the core material and tapped gate windings in the controlled device are proportioned such that this core material may be saturated during each half cycle of the excitation from the source. By adjustment of the D.-C. control signal in the control winding of the control reactor, the conducting intervals of the gate windings in the control reactor are regulated, and, in turn, the predetermined gate winding exciting current component can flow through the tapped gate windings of the controlled reactor only during these same intervals. The flux levels in the core material of the controlled reactor will be at levels dependent upon the lengths of such intervals, and "firing" or saturation of this material by influence of the gate windings of the controlled reactor will be advanced or delayed accordingly. Power output to the load is thereby accurately controlled.

The novel features which are believed to be characteristic of this invention are set forth with particularity in the appended claims. This invention, however, both as to its organization and method of operation, together with further objects and advantages thereof may best be understood through reference to the following description taken in connection with the accompanying drawings, wherein:

FIGURE 1 illustrates schematically a single-phase center-tap magnetic amplifier system embodying the present teachings;

FIGURE 2 graphically portrays the wave forms in a system such as that of FIGURE 1;

FIGURE 3 portrays a system of the type represented in FIGURE 1 wherein an alternative control circuit arrangement is employed;

Figures 1, 3, 4, 5, 6:
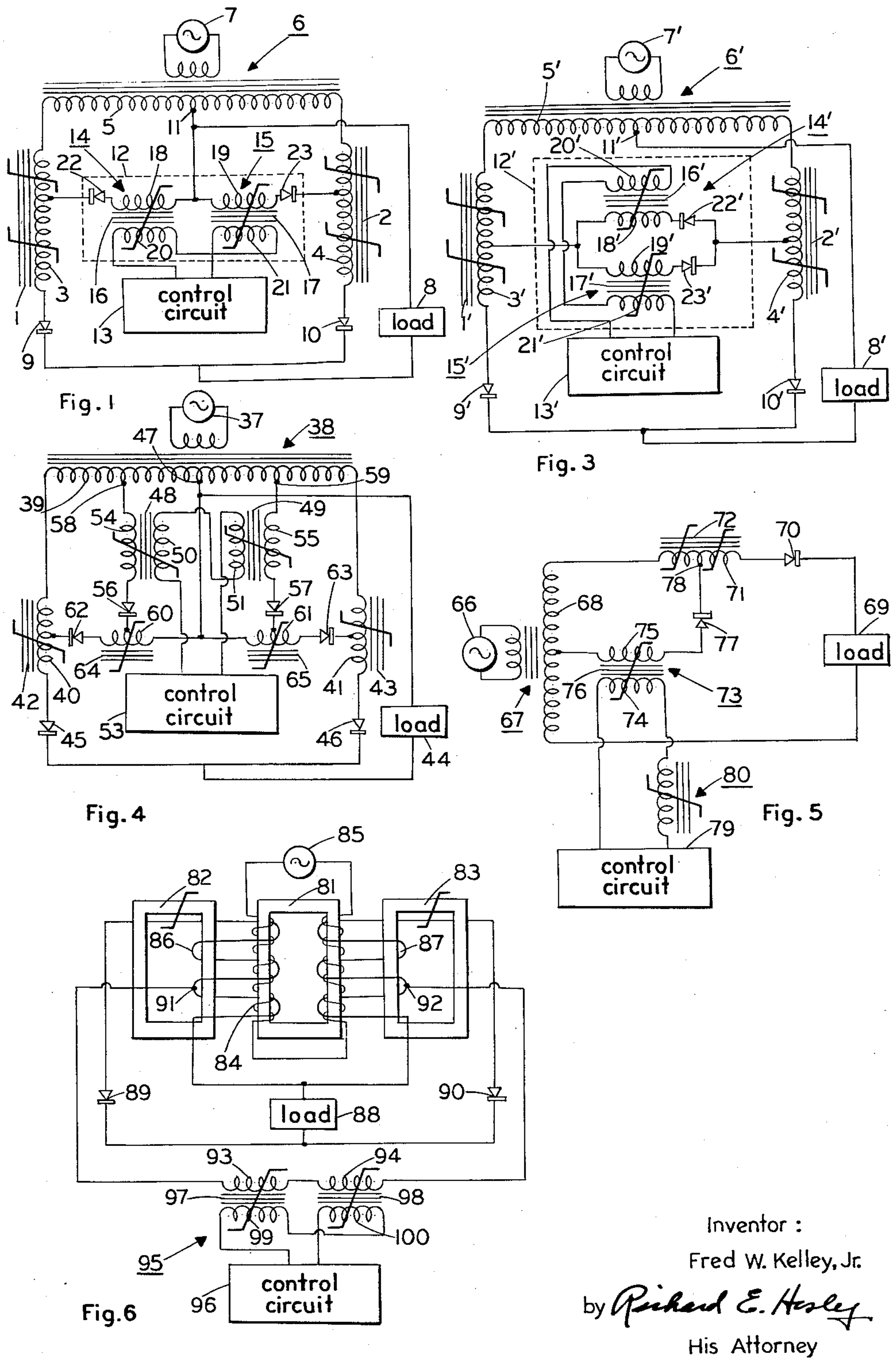
FIGURE 4 is a schematic diagram of an improved single-phase amplifier with dual control stages as taught by this invention.
FIGURE 5 depicts a half-wave single-phase circuit.
FIGURE 6 illustrates a lower-gain saturable reactance control system.

The single-phase center-tap circuitry of FIGURE 1 includes the conventional closed core reactor core members 1 and 2 about which appear tapped gate or load windings 3 and 4, respectively. Each of gate windings 3 and 4 is connected at one end with a different end of the center-tapped secondary 5 of an A.-C. supply transformer 6 having its primary winding excited by an A.-C. source 7, and each is also coupled with a D.-C. load 8 through a different one of dry rectifiers 9 and 10, respectively, the load being returned to the transformer secondary center tap 11.

As thus far described, the apparatus of FIGURE 1 could serve to deliver uncontrolled direct current outputs to the load 8. This operation would be expected were the reactor core material, gate windings, and supply voltages properly arranged such that saturation of cores 1 and 2 would occur during each of the alternate half cycles when excitation of proper polarity appeared across the associated rectifiers 9 and 10. However, the core "firing" or saturating times during these half cycles would remain fixed and the power output to the load could not be altered. As is well known, desired variations in the saturating times, with attendant output changes, may be accomplished through use of D.-C. control windings disposed about cores 1 and 2 and excited by a controlled source of direct current, except that the aforementioned disadvantages may be expected.

Improvements in control are realized with the control equipment represented within the dashed-line enclosure 12 and excited by a variable direct current control circuit 13. This equipment is observed to comprise a pair of saturable reactance devices 14 and 15 having saturable magnetic cores 16 and 17 and associated gate windings 18 and 19, respectively, as well as D.-C. control windings 20 and 21 disposed about cores 16 and 17 and excited by the variable D.-C. output of circuit 13. The output of circuit 13 may be varied manually or automatically in any conventional manner, as by adjustment of an impedance coupled with a D.-C. source in this control circuit. Dry rectifiers 22 and 23 are serially connected with gate windings 18 and 19 respectively, and these series combinations are in turn coupled across the transformer tap 11 and the taps on gate windings 3 and 4, respectively. Rectifiers 22 and 23 are each polarized such that they tend to conduct current during those intervals when the tapped gate windings 3 and 4 are blocked by their rectifiers 9 and 10, respectively. However, during any half cycle of the A.-C. excitation when one of rectifiers 22 and 23 tends to conduct, only the excitation current component associated with this control gate winding, 18 or 19, will flow until "firing" or saturation of its core 16 or 17 occurs. This excitation current component is set, by design, at a lesser value than the excitation current component required in the tapped portion of the main gate winding 3 or 4 to re-set the magnetic flux levels in the main reactor core 1 or 2. Accordingly, the flux level in core 1, for example, is substantially unchanged while the excitation current component of gate winding 18 flows through it and the tapped portion of main gate winding 3. Meanwhile, during the same half-cycle interval, the flux level can change in control core 16, and saturation occurs therein at a time regulated by the D.-C. caused to flow in winding 20 by control circuit 13, in the manner of amplistat operation. Upon saturation of core 16, a large control current tends to flow through gate winding 18, the level of this current now being high enough to be at the level of the gate winding excitation current component needed to flow through the tapped portion of main gate winding 3 to cause a shift in the flux level in main reactor core 1. The flux level in core 1 is then altered at a fixed rate for the balance of the half cycle under consideration. During the next succeeding half cycle, rectifier 22 blocks but rectifier 9 is enabled to conduct, and core 1 then becomes saturated after an interval governed by the flux level to which core 1 had been set in the preceding half cycle. Operation and influence of the other control reactor 15 is similar, on alternate half cycles. The output to load 8 is thus seen to be controlled by the D.-C. signals applied by control circuit 13. Because the power-handling requirements of equipment 12 are small, the bulk and size thereof may be of miniature proportions in relation to those of the main reactor structure.

Figure 2:
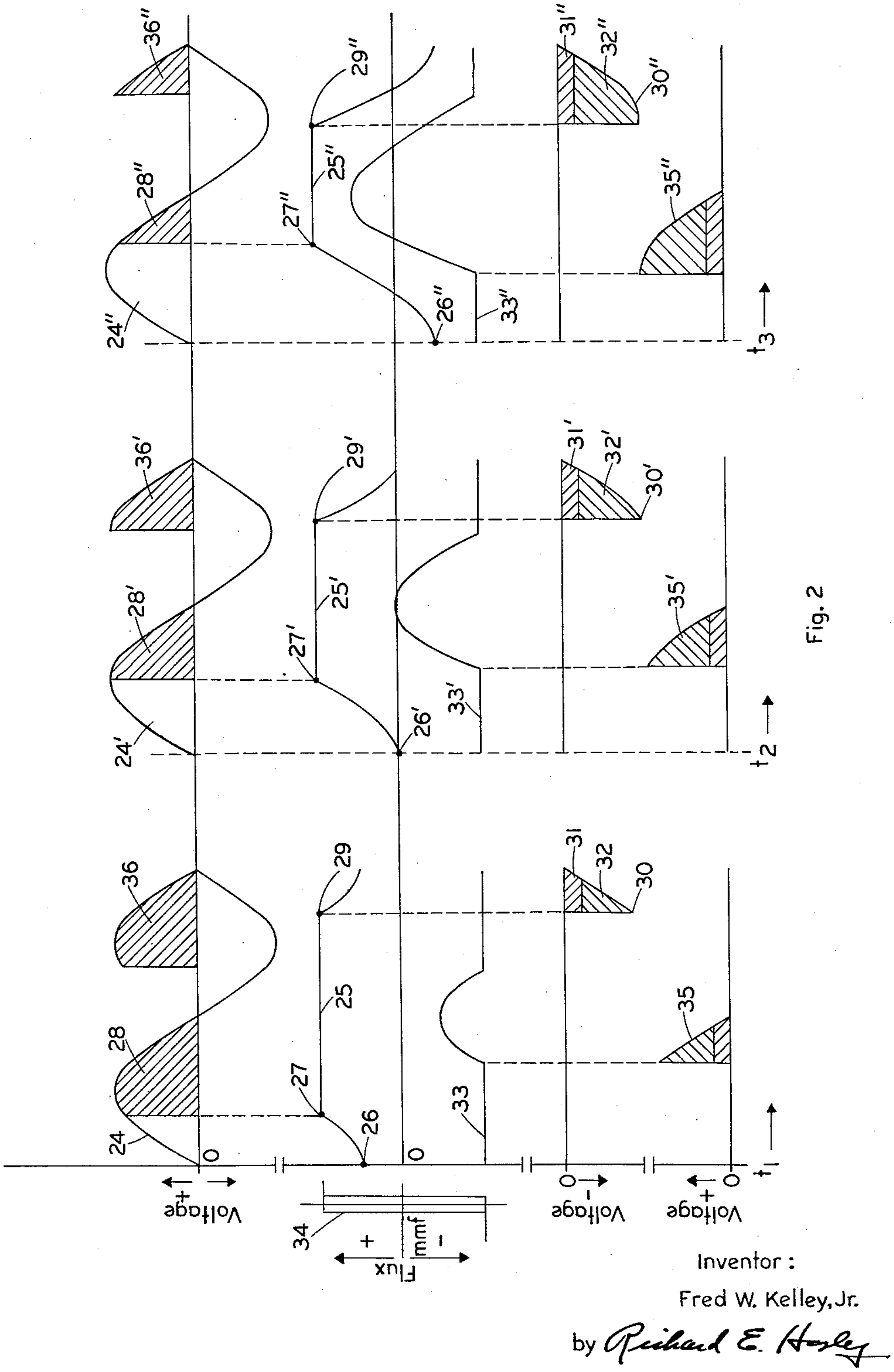

Referring to the wave-forms plotted in FIGURE 2, it may be observed that the voltage 24 impressed across the load and one of the main gate windings, 3, by one half of the secondary 5 of the A.-C. supply transformer 6 in FIGURE 1 is of a substantially sinusoidal character. A like voltage, oppositely phased, is of course impressed across the remaining main gate winding 4. As voltage 24 increases, subsequent to time $t_1$, exciting current flows through main gate winding 3, increasing the flux density 25 from the pre-set value 26 until the saturation point 27 is reached. Upon occurrence of saturation, substantially the full supply voltage 24 is impressed across the load, and this action continues for the balance of the first half cycle of voltage 24, as is represented by the cross-hatched portion 28 thereof. During the next succeeding negative half cycle of supply 24, exciting current may flow through the control reactor gate winding 18, as permitted by its rectifier 14, and this current acts jointly with the effects of the D.-C. control winding 20 to cause saturation of the control reactor core 16 at a predetermined time during this half cycle. At this instant of saturation, control gate winding 18 begins to conduct a larger current which equals the value of the excitation current required to flow in the tapped portion of main gate winding 3 to cause flux density changes in the main reactor core 1. Point 29 on the flux density curve 25 corresponds to the instant of the aforesaid saturation, and thereafter, the flux level in main core 1 decreases. The corresponding output voltage pulse 30, occasioned by control reactor 14, includes a resistive loss component, designated by the cross-hatched portion 31, and a portion 32 which appears across the tapped part of main gate winding 3. It is the voltage component 32 which serves to drive excitation current through the tapped part of gate winding 3 and to achieve a desired adjustment of the flux level in core 1. The duration of the pulse component 32 regulates the value to which the flux level in main core 1 is brought before the next positive half cycle of supply voltage appears across the gate winding 3. This flux level in turn establishes the time during which "firing" or saturation of core 1 is delayed during this next half cycle; and the output to the load is regulated accordingly.

Flux levels in the other main core, 2, are depicted by curve 33, which appears together with curve 25 opposite the reference hysteresis curve 34 for idealized square-loop magnetic material. Voltage output pulse 35 is that for the other control saturable reactor, 15, in FIGURE 1, and the operation of the other half of the control equipment will be understood to correspond to that already discussed in detail. The load output voltage includes not only the cross-hatched portions 28, but pulses corresponding to the cross-hatched wave 36 which results from operation in the other half of the circuitry including main gate winding 4.

That the output to the load varies may be perceived through reference to the similar plots in FIGURE 2 commencing at times $t_2$ and $t_3$. Wave forms corresponding to those plotted from time $t_1$ bear the same reference characters, with distinguishing prime accents added. For a different and higher control current flowing in control windings 20 and 21, for example, the saturations of cores 16 and 17 represented by outputs 30′ and 35′ occur earlier than in the case last considered. The magnetizing or exciting currents thus flow in the main gate windings 3 and 4 for longer periods of time and alter the flux levels in cores 1 and 2 to a greater extent. Accordingly, the intervals during which outputs 28′ and 36′ can flow to the load 8 are shortened, and the output is lessened. The conditions represented commencing at time $t_3$ are even more pronounced in these same respects, such that the outputs 28″ and 36″ are still smaller.

FIGURE 3 includes magnetic amplifier components which correspond to those of FIGURE 1, and in the interest of a simplified presentation, the same reference characters, with prime accents, are utilized to identify such components. Differences in the magnetic amplifier systems of FIGURES 1 and 3 are found wholly in the arrangements of control equipments 12 and 12′. FIGURE 3 illustrates that the control reactors 14′ and 15′, together with their series rectifiers 22′ and 23′, respectively, may each be coupled directly between the taps on the main gate windings 3′ and 4′. Operation is substantially the same as that in FIGURE 1, wherein each of the combinations of control reactors 15 and 16 with their series rectifiers 22 and 23 is coupled with but one of the tapped gate windings 3 and 4 and with the center-tap 11 of the supply transformer secondary. The control reactor gate windings 18′ and 19′ in FIGURE 3 are of course designed to have substantially the full transformer secondary voltages impressed across them.

Two control stages within a magnetic amplifier system are depicted in FIGURE 4, such an arrangement being capable of controlling very large outputs with only relatively minute D.-C. control signals. Advantages in terms of total equipment size and weight alone are most pronounced and in fact make feasible the use of wholly static magnetic amplifier equipment, with the well-known attendant benefits, where such usage would otherwise be prohibited. Source 37 in FIGURE 4 excites a transformer 38, the secondary 39 of which has its ends connected with tapped main gate windings 40 and 41 associated with main reactor cores 42 and 43, respectively. Main gate windings 40 and 41 are connected to a D.-C. load 44 through rectifiers 45 and 46, respectively, the load being returned to the A.-C. supply by way of the center tap 47 on transformer secondary 39. To this main reactor circuitry there are added a first and an intermediate control stage. The first control stage includes a pair of reactor cores 48 and 49 about which are disposed the conventional type of D.C. control windings 50 and 51 excited by a control circuit 53 which yields adjustable D.-C. control signals. In addition, the first control stage includes gate windings 54 and 55 each serially coupled with one of the rectifiers 56 and 57. These gate windings and associated rectifiers are supplied with A.-C. signals appearing between the quarter-position transformer secondary taps 58 and 59 and the center tap 47, connections being completed through tapped portions of gate windings 60 and 61 of the intermediate control stage. The intermediate control stage is also provided with rectifiers 62 and 63 each serially coupled with a different one of tapped gate windings 60 and 61 and a different one of the tapped main gate windings 40 and 41. A.-C. excitation for the intermediate stage gate windings 60 and 61 may be traced from the transformer secondary tap 47, through rectifiers 62 and 63, through the tapped portions of main gate windings 40 and 41, and to the outer ends of secondary winding 39.

Gate windings 54 and 55 of the first control stage will cause saturation of their cores 48 and 49 at times regulated by the adjustment of D.-C. control current in the control windings 50 and 51. Prior to such saturation, the magnetizing current or excitation current component for gate windings 54 and 55 will flow through them and through the tapped portions of the intermediate stage gate windings 60 and 61. However, such magnetizing current is of a value insufficient to change flux levels in the cores 64 and 65 of gate windings 60 and 61. Upon saturation of one of the cores, 48, for example, a larger current flows through gate winding 54 and through the tapped portion of gate winding 60, this current now being commensurate with changes in the flux level in core 64. During the next half-cycle, gate winding 60 first conducts magnetizing current and then, upon saturation of its core 64, conducts current which is commensurate with changes in the flux level in main core 42 while flowing through that tapped portion of main gate winding 40. In the next half cycle, during which gate winding 54 repeats the aforesaid operation, main gate winding 40 saturates core 42 and causes delivery of power to load 44. Operation in the other half of the circuitry is similar, although phase displacements are 180 degrees. Adjustments of control signals from control circuit 53 thereby effectuate variations in the output to the load 44, the gain being particularly high.

FIGURE 5 depicts half-wave circuitry in which these teachings may be expressed. A.-C. source 66 there energizes a transformer 67, the secondary 68 of which is coupled across the series combination of a load 69, rectifier 70, and tapped reactor gate winding 71. The arrangement thus far described tends to deliver a constant and uncontrollable output to load 69, inasmuch as saturation of the gate winding core 72 occurs at the same part of alternate half cycles. Control is exercised by the control reactor apparatus 73, however, which includes a control winding 74 and gate winding 75 about a saturable magnetic core 76. The series combination of the control gate winding 75 and a dry rectifier 77 is coupled between the tap 78 on the main gate winding 71 and a suitable tap on the transformer secondary 68. A control circuit 79, which is a source of adjustable D.-C. control signals, delivers excitation to the control winding 74 through an inductor 80 which possesses a high impedance precluding circulation of induced A.-C. signals in the control circuitry. During supply alternate cycles of one polarity, the main reactor rectifier 70 blocks and the control rectifier 77 conducts. At such times, the control magnetizing current through control gate winding 75 is smaller than the main magnetizing current required to flow through the tapped portion of main gate winding 71 to alter flux levels in main core 72. Upon saturation of control core 76, at times regulated by the output of control circuit 79, the main magnetizing current flows, and the fluxes in main core 72 are driven to levels which are also related to the output of control circuit 79. During the other half-cycles from the A.-C. supply, control rectifier 77 blocks and main rectifier 70 conducts, whereupon main core 72 is saturated at times dependent upon the flux levels which had been set by operation of the control circuitry. These saturating times govern the output to load 69, and the latter is found to be related to the output of control circuit 79.

The application of certain of these teachings to a transformer-amplistat combination appears in FIGURE 6, the control arrangement there being of a lower-gain type. Transformer-amplistat units having similar constructional features are disclosed in my copending application S.N. 616,311, filed October 16, 1956, for "Transformer-Amplistat," now Patent No. 2,870,397 issued January 20, 1959, and assigned to the same assignee as that of the present application. The apparatus of FIGURE 6 includes a controlled core 81 and a pair of control cores 82 and 83, a transformer primary winding 84 excited by A.-C. source 85 being wound wholly about controlled core 81, and two secondary winding halves 86 and 87 each being wound about the controlled core 81 and a different one of the control cores 82 and 83. D.-C. load 88 is coupled across the series combination of secondary half 86 and a rectifier 89, and across the series combination of secondary half 87 and rectifier 90. Control windings are absent from this transformer-amplistat structure and, instead, control is achieved through the tapped portions of the secondary winding halves 86 and 87. Taps 91 and 92 are illustrated on windings 86 and 87, respectively, and the series gate windings 93 and 94 of a controlled reactor arrangement 95 are shown coupled between these taps. Except for the control circuitry, the load 88 would receive uncontrollable outputs from the transformer-amplistat unit. However, control cores 82 and 83 are caused to have flux levels therein varied in accordance with the outputs of control signals from a control circuit 96, and the occurrences of saturation in these cores are thus regulated, as are the attendant outputs to the load 88 also. The control saturable reactance device is shown to include the aforesaid gate windings 93 and 94 cooperating with saturable cores 97 and 98 and control signal windings 99 and 100. Through use of the dual opposed reactor arrangement in the control reactor circuitry, the undesirable effects of induced A.-C. signals in the control circuitry are avoided. "Firing" or saturation of the reactor cores 97 and 98 occurs during each supply half cycle, under control of the output from control circuit 96, whereupon magnetization current for achieving flux level changes in one of the two control cores 82 and 83 flows through one of the winding halves 86 and 87 during the period when its associated rectifier, 89 or 90, as the case may be, prevents delivery of output to load 88.

Figure 7:
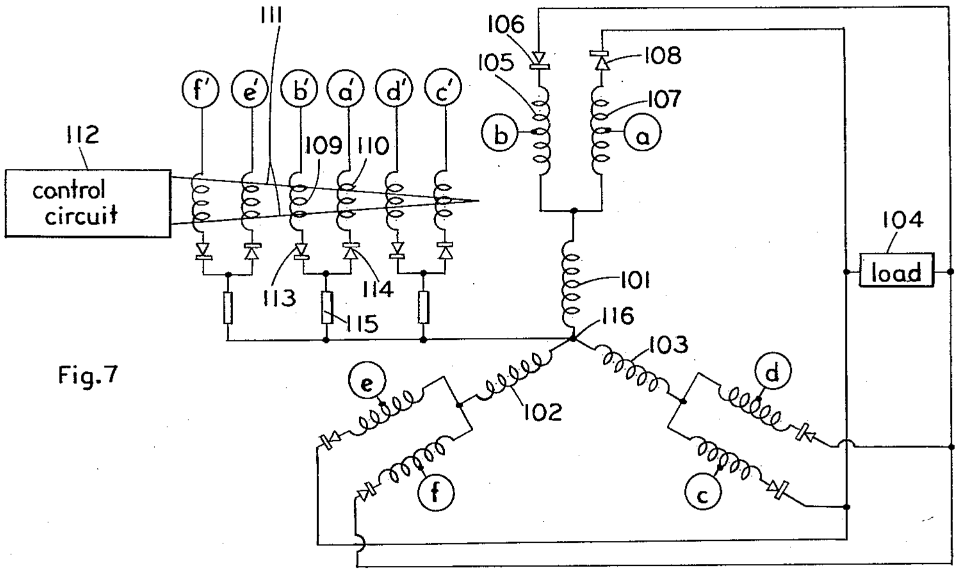
FIGURE 7 is a schematic portrayal of a three-phase magnetic amplifier embodying improved control provisions.

A three-phase full-wave bridge amplistat circuitry evidencing the improved saturable reactance control characteristics obtained through practice of this invention is depicted in FIGURE 7. A.-C. supply transformer windings 101 through 103 provide the required three-phase A.-C. excitation, and in each of the system phases there are connected a pair of tapped main gate windings and series-coupled rectifiers through which connection is made to the D.-C. load 104. Cores are not represented in the drawing, their locations and configurations being understood by those skilled in the art. Considering one branch, that connected with supply transformer winding 101, for example, there are present a tapped gate winding 105 and series rectifier 106 coupled to one side of load 104, and a tapped gate winding 107 and series rectifier 108 coupled to the other side of load 104. Like components appear in the remaining two branches of the system. Taps *a* and *b* on gate windings 105 and 107 are connected with the leads designated by the same letters with prime accents, as are the other lettered taps also, these leads being coupled with gate windings 109 and 110 of the control reactor circuitry having control winding means 111 excited by the adjustable D.-C. signals from control circuit 112. Rectifiers 113 and 114 are in series with control gate windings 109 and 110, respectively, and a common return to the A.-C. supply is provided through a resistance 115 connected with the center tap 116 of the Y-connected supply windings. Resistance 115 may be desirable in providing an adjustment of current flow in the control circuitry, thereby aiding in regulation of the saturation characteristics. Operating phenomena are generally similar to those experienced in the single-phase circuitry of FIGURE 1, with expected differences characteristic of polyphase circuitry.

Figure 8:
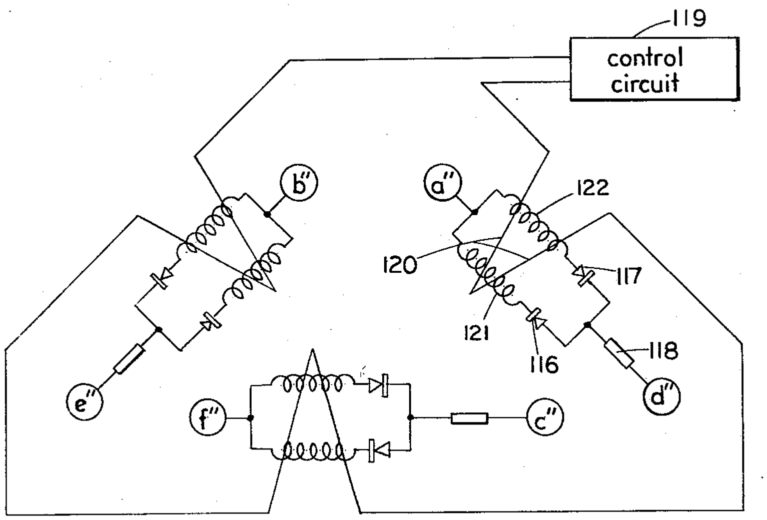
FIGURE 8 shows an alternative control circuit arrangement for the three-phase system of FIGURE 7.

Control of the polyphase circuitry illustrated in FIGURE 7 may be accomplished through alternative control circuit couplings also, one of these alternatives being represented in FIGURE 8, with the connecting leads identified by letters corresponding to those of the gate winding taps in FIGURE 7. Distinguishing double-prime accents are applied. Three pairs of control reactor gate windings are employed in each control branch, as in the case of gate windings 121 and 122, and each gate winding is in series relationship with a different rectifier. Rectifiers 116 and 117 are in series with the control gate windings 121 and 122, respectively, for example, and these series combinations are paralleled and placed in series with a suitable resistance 118 which may aid in regulation of the saturation characteristics in the system. Control windings for the three control branches are excited by the adjustable D.-C. signal outputs of a control circuit 119, the control winding means associated with control reactor elements 114 and 115 being identified by reference character 120. Operating phenomena with the control circuitry of FIGURE 8 are generally similar to those experienced in the single-phase circuitry of FIGURE 3, with expected differences characteristic of polyphase circuitry.

In the aforedescribed systems the main reactors have been associated with gate windings tapped intermediate their ends. It should be apparent that, if these gate windings are tapped at their ends directly connected to the A.-C. supply terminals, the magnetization current or main gate winding excitation current component cannot flow through any part of the main gate windings and the main reactor cores cannot have their flux levels changed to occasion variations in output to the main load. Also, if the taps are placed very near these same ends, the magnetizing current which must flow must be large, because of the few main gate winding turns which are effective, and the control reactors must be designed to meet the larger output requirements. While the taps may be moved to the opposite ends of the main gate windings, it will usually be found more desirable to include fewer than all the main gate winding turns, because compensation may then be had for drops in the control gate winding circuitry. Main gate winding taps which will enable the control circuitry to embrace from about 50 to about 80 percent of the main gate winding turns appear to be highly satisfactory.

While particular embodiments of this invention have been shown and described, it will occur to those skilled in the art that various changes and modifications can be made without departure from the invention, and therefore, it is aimed in the appended claims to cover all such changes and modifications as fall within the true spirit and scope of the invention.

What I claim as new and desire to secure by Letters Patent of the United States is:

1. Apparatus for effecting controlled electrical excitation of a load comprising a source of periodically varying voltage, a power amplifier stage comprising a first saturable magnetic core means, first gate winding means disposed in inductive relationship with said core means, a rectifier, means for applying signals from said source to said load through said first gate winding means and through said rectifier, an input control stage comprising a second saturable magnetic core means, second gate winding means disposed in inductive relationship with said second core means, a source of adjustable unidirectional current, control means controlling the saturation characteristics of said second core means responsive to signals from said unidirectional current source, and means coupling said second gate winding means with said source of periodically varying voltage through said first gate winding means.

2. Apparatus for effecting controlled electrical excitation of a load comprising a source of periodically varying voltage, a power amplifier stage comprising a first saturable magnetic core means, a first gate winding disposed in inductive relationship with said core means, a rectifier, means for applying signals from said source to said load through said gate winding and through said rectifier, an input control stage comprising a second saturable magnetic core means, a second gate winding disposed in inductive relationship with said second core means, a source of adjustable unidirectional current, control means controlling the saturation characteristics of said second core means responsive to signals from said unidirectional current source, and means coupling said second gate winding with said source of periodically varying voltage through a portion of said first gate winding.

3. Apparatus for effecting controlled electrical excitation of a load comprising a source of alternating current, a power amplifier stage comprising a first saturable magnetic core means, a first gate winding disposed in inductive relationship with said core means and having connection means for electrically tapping into a portion of said winding, a rectifier, means for applying signals from said source to said load through said first gate winding and said rectifier, input control stage comprising a second saturable magnetic core means, a second gate winding disposed in inductive relationship with said second core means, a source of adjustable unidirectional current, control winding means disposed in inductive relationship with said second core means and energized by said source of unidirectional current, and means coupling said second gate winding with said source of alternating current through said connection means and the tapped portion of said first gate winding.

4. Apparatus for effecting controlled electrical excitation of a load comprising a source of alternating current, a power amplifier stage comprising a first saturable magnetic core means, first gate winding means disposed in inductive relationship with said core means, a first dry current rectifier, means for applying signals from said source to said load through said first gate winding means and said rectifier, an input control stage comprising a second saturable magnetic core means, a second gate winding disposed in inductive relationship with said second core means, a source of adjustable unidirectional current, control means controlling the saturation characteristics of said second core means responsive to excitation by said source of unidirectional current, a second dry current rectifier, and means coupling said second gate winding with said source of alternating current through said second rectifier and through said first gate winding means, said first and second rectifiers being polarized to conduct current during different half cycles of the alternating current from said source of alternating current.

5. Apparatus for effecting controlled electrical excitation of a load comprising an alternating current source, first and second gate winding means disposed in inductive relationship with saturable magnetic material, first and second rectifiers, means coupling said load with said source through said first gate winding means and said first rectifier, means coupling said load wtih said source through said second gate winding means and said second rectifier, said source and rectifiers being coupled such that said first and second gate windings tend to conduct current during different alternate half cycles of said alternating current, third and fourth gate winding means disposed in inductive relationship with saturable magnetic material, third and fourth rectifiers, a source of adjustable unidirectional electrical signals, control means for controlling the saturation characteristics of said magnetic material associated with said third and fourth gate winding means responsive to signals from said unidirectional signal source, means coupling said third gate winding means with said alternating current source through said third rectifier and through at least a portion of said first gate winding means, said third rectifier being polarized to conduct current when said first rectifier blocks current, and means coupling said fourth gate winding means with said alternating current source through said fourth rectifier and through at least a portion of said second gate winding means, said fourth rectifier being polarized to conduct current when said second rectifier blocks current.

6. Apparatus for effecting controlled electrical excitation of a load comprising an alternating current source, at least one pair of main gate windings disposed in inductive relationship with saturable magnetic material, at least one pair of load circuit rectifiers, means coupling each of said pair of main gate windings with said load and said source through a different one of said rectifiers, said source and rectifiers being coupled such that each of said pair of main gate windings tends to conduct current during different alternate half cycles of said alternating current, at least one pair of control gate windings disposed in inductive relationship with saturable magnetic material, a source of adjustable unidirectional control signals, control winding means disposed in inductive relationship with the saturable magnetic material associated with said control gate windings, means applying said control signals from said unidirectional signal source to said control winding means, at least one pair of control circuit rectifiers, means coupling one of said pair of control gate windings with said alternating current source through one of said pair of control circuit rectifiers and through at least a portion of one of said pair of main gate windings, and means coupling the other of said pair of control gate windings with said alternating current source through the other of said pair of control circuit rectifiers and through at least a portion of the other of said pair of main gate windings.

7. Apparatus for effecting controlled electrical excitation of a load comprising an alternating current source, at least one pair of main gate windings disposed in inductive relationship with saturable magnetic material, at least one pair of load circuit rectifiers, means coupling each of said pair of main gate windings with said load and said source through a different one of said rectifiers, said source and rectifiers being coupled such that each of said pair of main gate windings tends to conduct current during different alternate half cycles of said alternating current, at least one pair of intermediate control gate windings disposed in inductive relationship with saturable magnetic material, at least one pair of intermediate control circuit rectifiers, means coupling each of said pair of intermediate control gate windings with said source through a different one of said pair of intermediate control circuit rectifiers and through at least a portion of a different one of said pair of main gate windings, a pair of primary control circuit gate windings disposed in inductive relationship with saturable magnetic material, a source of adjustable unidirectional control signals, control winding means responsive to said unidirectional control signals and disposed in inductive relationship with said saturable magnetic material associated with said primary control circuit gate windings, at least one pair of primary control circuit rectifiers, and means coupling each of said pair of primary control circuit gate windings with said source through a different one of said pair of primary control circuit rectifiers and through at least a portion of a different one of said pair of intermediate control circuit gate windings.

8. Apparatus for effecting controlled electrical excitation of a load comprising an alternating current source, at least one pair of tapped load circuit gate windings disposed in inductive relationship with saturable magnetic material, at least one pair of load circuit rectifiers, means coupling each of said pair of gate windings with said load and said source through a different one of said rectifiers, said source and rectifiers being coupled such that each of said pair of gate windings tends to conduct load current during different alternate half cycles of said alternating current, at least one control circuit gate winding disposed in inductive relationship with saturable magnetic material, control winding means disposed in inductive relationship with said magnetic material associated with said control circuit gate winding, a source of adjustable unidirectional control signals exciting said control winding means, and means coupling said control circuit gate winding with said source through tapped portions of said tapped load circuit gate windings.

9. Apparatus for effecting controlled electrical excitation of a load comprising an alternating current source, at least three bi-phase amplistats each including a pair of gate windings serially coupled with a different dry current rectifier and disposed in inductive relationship with saturable magnetic material, the gate windings of the first and second of said amplistats being electrically tapped intermediate the ends thereof, means coupling the gate windings and series rectifiers of said first amplistat with said source through said load, means coupling each of the gate windings and the rectifier in series therewith of said second amplistat with said source through a tapped portion of a different one of said tapped gate windings of said first amplistat, control winding means disposed in inductive relationship with said magnetic material of said third amplistat, a source of adjustable unidirectional control signals exciting said control winding means, and means coupling each of the gate windings and the rectifier in series therewith of said third amplistat with said source through a tapped portion of a different one of said tapped gate windings of said second amplistat, whereby adjustments of said control signals effect adjustments of outputs to said load.

References Cited in the file of this patent

UNITED STATES PATENTS

| | | |
|---|---|---|
| 2,683,853 | Logan | July 13, 1954 |
| 2,700,128 | Woerdemann | Jan. 18, 1955 |
| 2,910,643 | Patton | Oct. 27, 1959 |
| 2,922,946 | De Lalio | Jan. 26, 1960 |